United States Patent [19]

Bergmans

[11] Patent Number: 5,151,891
[45] Date of Patent: Sep. 29, 1992

[54] METHOD AND APPARATUS FOR ASSIGNING BINARY VALUES TO SAMPLE VALUES OF A WAVEFORM REPRESENTING A PATTERN OF RECORDING MARKS ON A RECORD CARRIER

[75] Inventor: Johannes W. M. Bergmans, Eindhoven, Netherlands

[73] Assignee: U.S. Philips Corporation, New York, N.Y.

[21] Appl. No.: 427,674

[22] Filed: Oct. 25, 1989

[30] Foreign Application Priority Data

Nov. 9, 1988 [GB] United Kingdom ............... 8826266

[51] Int. Cl.⁵ .................. H04N 5/76; G11B 5/09; G11B 7/00
[52] U.S. Cl. ........................... 369/59; 369/124; 360/53
[58] Field of Search ............... 369/59, 54, 56, 58, 369/106, 109, 116, 124; 360/39, 40, 53

[56] References Cited

U.S. PATENT DOCUMENTS

| | | | |
|---|---|---|---|
| 3,988,531 | 10/1976 | Laub | 369/61 |
| 4,549,288 | 10/1985 | Chan | 369/48 |
| 4,626,670 | 12/1986 | Miller | 235/436 |
| 4,637,006 | 1/1987 | Bierhoff | 369/59 |
| 4,648,085 | 3/1987 | Shimonou | 369/58 |
| 4,688,204 | 8/1987 | Noyes, Jr. et al. | 369/59 |
| 4,734,900 | 3/1988 | Davie | 369/59 |
| 4,835,759 | 5/1989 | Saito et al. | 369/59 |
| 4,866,692 | 9/1989 | Saito et al. | 369/54 |
| 4,873,680 | 10/1989 | Chung et al. | 369/116 |
| 4,890,275 | 12/1989 | Mori | 369/59 |
| 4,908,811 | 3/1990 | Yokogawa et al. | 369/60 |
| 4,975,897 | 12/1990 | Tanahashi | 369/59 |

Primary Examiner—Aristotelis Psitos
Assistant Examiner—Jefferson Evans
Attorney, Agent, or Firm—Leroy Eason

[57] ABSTRACT

A detector circuit assigns binary values to a series of sample values taken periodically from a waveform representing a binary pattern of marks on a record carrier, the pattern of marks nominally having a minimum run length of more than one sampling period. The detector determines whether the pattern is subject to a first or a second type of systematic error, the first type causing the marks on the record carrier to be systematically too short and the second type causing them to be too long. For each sample value $a_k$, a plurality of successive sample values ($a_{k-1}$, $a_{k+1}$) which include the sample value $a_k$ are combined to generate one or more combined sample values. Each such combined sample value is compared with a threshold value ($u'/u''$), and in accordance with the results of such comparisons a binary value ($A_k'$) is assigned to the sample $a_k$ using a logic relationship dependent on which type of systematic error is present. The detector may be included in an optical disc player.

13 Claims, 5 Drawing Sheets

METHOD AND APPARATUS FOR ASSIGNING BINARY VALUES TO SAMPLE VALUES OF A WAVEFORM REPRESENTING A PATTERN OF RECORDING MARKS ON A RECORD CARRIER

BACKGROUND OF THE INVENTION

1. Field of the Invention

The invention relates to a method of assigning binary values to a series of sample values taken periodically from a waveform representing a binary pattern of marks on a record carrier, the pattern of marks nominally having a minimum run length of more than one sampling period. The invention further relates to detector apparatus for performing such a method and to an optical disc player including such a detector.

2. Description of the Related Art

The method described can be referred to as "bit detection" and may be used in particular in reading information from optical record carriers. A well-known example of such method is in the Compact Disc (CD) system for audio and data recording. The CD and other optical recording systems have been described in "Principles of Optical Disc Systems" by G. Bouwhuis et al, published by Adam Hilger, Bristol, UK (ISBN 0-85274-785-3). In the CD system, for example, a minimum run length of three samples is assured by virtue of the Eight-to-Fourteen Modulation (EFM) employed. Many other kinds of minimum run length modulation are also known, however.

Disturbances may be introduced by the reading apparatus (CD-player) into the information read from a record carrier, for example because of optical effects during reading. It is known from the above reference that such disturbances may be regarded as linear and (quasi-) stationary to a good approximation. In the event of such disturbances, and if noise plays a subordinate part (as it does in the CD-player), the recorded data sequence can be recovered reliably by means of the customary combination of a fixed linear equaliser and a threshold detector. A threshold detector for use in optical recording apparatus is disclosed for example in U.S. Pat. No. 4,499,570 assigned to the present assignee.

Properly manufactured CD records do not introduce any significant additional disturbances. However, it is found that in practice there are discs which have pits which are systematically too short or too long, in particular as a result of imperfect etching in the mastering process. In extreme cases this may result in the minimum run length of zeros being increased or reduced by almost two sample periods relative to the nominal EFM value of 3 sample periods, and similarly for the minimum run length of ones. Because of the non-stationary (or, depending on the point of view, even non-linear) nature of this imperfection a fixed (and consequently time-invariant) linear equaliser is intrinsically not capable of effectively suppressing this disturbance.

It is customary therefore to make a compromise and design the equaliser such that even in extreme situations a certain decision margin is still left for the threshold detector. However, since this margin is small, even minor disturbances in, for example, the speed of rotation, or in focussing and clock generation, may lead to decision errors. Correction of these errors requires part of the capacity of the error-correction system of the CD-player, which is then no longer available for reducing the effect of, for example, scratches and finger marks on the record carrier.

As well as the case of poorly-manufactured Compact Disc records, systematic error is also a problem in the field of writable optical recording systems, where recordings are made on a large number of individual recorders rather than in a carefully monitored factory environment.

SUMMARY OF THE INVENTION

It is an object of the invention to enable the correct assignment of binary values to a series of samples of the kind described, even in the presence of systematic error, with a better decision margin than in known systems.

The invention provides a method as set forth in the opening paragraph comprising determining whether the pattern is subject to a first or a second type of systematic error which causes the marks on the record carrier to be systematically too short or too long respectively, and further comprising for each given sample: combining a plurality of successive sample values including the given sample value to generate one or more combined sample value(s), comparing each of the combined sample values with a threshold level, and assigning a binary value to the given sample in response to the result(s) of one or more such comparisons in a manner dependent on which type of systematic error, if any, is present. The overall decision margin when using combined sample values can be made much greater than that for each individual sample. This results from the correlation between adjacent values that arises in patterns having a minimum run length characteristic. When coupled with information as to the type of systematic error present in a given recording, the bit detection can be made substantially immune to the systematic error. The error correcting capacity of later stages can therefore be reserved for less predictable errors.

The number of successive samples that can be used advantageously will depend on the run length characteristics of the recorded pattern and on the response of the reading device, for example the diameter of the focussed radiation spot in an optical disc player. In the CD system, it is found that using 3 successive samples affords a substantial benefit while requiring only simple implementation.

In an economical embodiment in which three successive sample values are used per sample, the method comprises for each given sample:
a) combining the given sample value with one of the two adjacent sample values;
b) comparing the combined value with a predetermined threshold level; and
c) depending on the result of that comparison either:
  (i) assigning a first (e.g., a "1") binary value to the given sample, or
  (ii) combining the given sample value with the other adjacent sample value to generate a further combined value, comparing the further combined level, with the threshold value and depending on the result of that comparison assigning either the first or a second (e.g., a "0") binary value to the given sample. By avoiding the need to deal with more than two sample values in each comparison, this embodiment permits a particularly simple implementation.

It is possible in principle to predict which of the two possible combinations will define the correct binary value, so that the step (c) (ii) should not be necessary. In practice, however, the implementation may be simpler if both combinations are made for every sample, even when not strictly needed. Therefore in one embodiment of the method each of the two adjacent sample values is combined with the given sample value and each combined value is compared with the threshold level, the results of the two comparisons being logically combined to generate the binary value assigned to the given sample. The logical combination, which may be a simple AND or OR operation, can be chosen to extract automatically the correct binary value from whichever of the two comparison results is the deciding one.

In such an embodiment, the logical operation used to generate the binary value from the two comparison results is dependent on which type of systematic error is present. The operation may for example be an OR in one case and an AND in the other. In effect, two different methods are provided to allow for both types of systematic error. The required method can be performed continuously, or only at the start of a given recording, for example by a comparison of the threshold levels obtained adaptively using both methods. In a recording produced in a single process (such as a pre-recorded CD pressed at a factory), the systematic error is likely to remain constant over the whole record carrier.

In an economical embodiment, each given sample value is combined with the next sample value in the series and the combined level compared with the threshold value and the result of each such comparison is stored for at least one sampling period to form a comparison result for use in determining the binary value for the next given sample. In such an embodiment there is no need to perform two threshold comparisons for each sample, since each comparison result can be used for two given samples.

The invention further provides a detector for assigning binary values to a series of sample values taken periodically from a waveform representing a binary pattern of marks on a record carrier, the pattern of marks nominally having a minimum run length of more than one sampling period, the detector comprising means for determining whether the pattern is subject to a first or a second type of systematic error which causes the marks on the record carrier to be systematically too short or too long respectively, and further comprising means for combining a plurality of successive sample values including a given sample value to generate a combined sample value or values, means for comparing each combined sample level with a threshold value and means responsive to the result(s) of one or more such comparisons, for assigning a binary value to the given sample in a manner dependent on which type of systematic error, if any, is present.

In an economical embodiment, the detector may comprise:
means for combining each given sample value with one of the two adjacent sample values;
means for comparing the combined value with a predetermined threshold level; and
means responsive to the result of that comparison for either:
  (i) assigning a first binary value to the given sample, or
  (ii) combining the given sample value with the other adjacent sample value to generate a further combined value, comparing the further combined level with the threshold value and depending on the result of that comparison assigning with the first or a second binary value to the given sample.

The detector may comprise means for combining each of the two adjacent sample values with the given sample value, means for comparing each combined level with the threshold value, and means for logically combining the results of the two comparisons to generate the binary value assigned to the given sample.

The logical combining means used to generate the binary value from the two comparison results may be controlled by the means for determining which type of systematic error is present. Such a detector can be made to adapt the detection method automatically to the type of systematic error encountered. In such a detector the threshold value may be determined adaptively by feedback of previously assigned binary values, and the means for determining which type of systematic error is present may be responsive to the threshold value in order to determine the logical operation required. Choosing the detection method which gives the lowest threshold level for a given recording is one technique for determining which type of systematic error is present.

The detector may comprise means for combining each given sample value with the next sample value in the series, means for comparing the combined level with the threshold value and means for storing the result of each such comparison for at least one sampling period to form a comparison result for use in determining the binary value for the next given sample. The hardware required for such a detector may be very little more than is required for the known detector.

The invention still further provides an optical disc player including a detector in accordance with the invention as set forth above. Such a player allows more reliable and noise-free reproduction of information from an optical disc such as a CD, even in the case of a poorly-manufactured disc suffering from systematic error in the lengths of the marks.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

Figure 1:
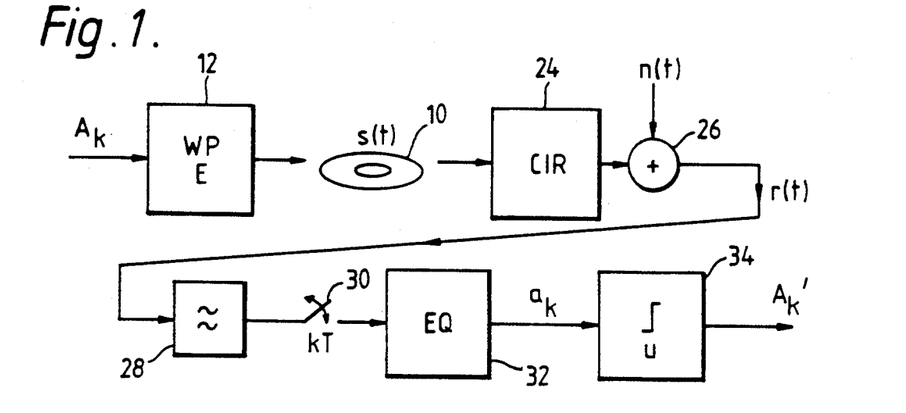
FIG. 1 shows schematically the Compact Disc channel using a known bit detector.

In FIG. 1, a stream of binary data $A_k$ is recorded on a record carrier 10 such as an optical Compact Disc and subsequently read from the carrier 10 to generate a data stream $A_k'$ which is ideally an exact copy of the input stream $A_k$. The recording and reproducing process involves several steps however which can introduce errors in the output data $A_k'$.

A writing process 12 generates a pattern of marks on the record carrier which can be represented as a binary function s(t), where t represents distance along a track, or represents elapsed time when the marks are subsequently read by a relatively moving reading head. The writing process 12 may comprise an etching and stamping process for mass replication of records such as the currently available Compact Discs, or may for example comprise direct recording by an ablative, magneto-optical or phase-change technique such as those described in Chapter 6 of the first-mentioned reference (Bouwhuis et al).

Figures 2A, 2B:
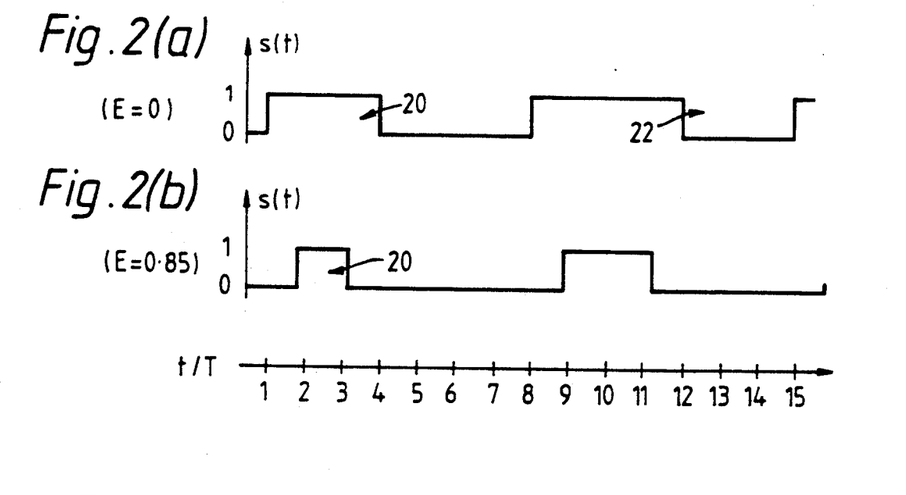
FIG. 2(a) and 2(b) show the pattern of marks recorded on a perfectly-manufactured disc and a badly "over-etched" disc.

FIG. 2(a) shows a pattern s(t) that might be recorded on a record, against a scale of sampling periods or symbol intervals kT, where k is an integer and T is the length of each symbol interval. The pattern s(t) may for example represent the pattern of "pits" (s=0) and "Lands" (s=1) in the reflective layer of a Compact Disc. This pattern has a minimum run length of ones or zeros of 3T as governed by the EFM coding used. Thus the land referenced 20 and the pit referenced 22 in FIG. 2(a) are nominally the shortest land and pit that should be found in the pattern.

However, the writing process 12 can introduce a systematic error E in the lengths of the ones and zeros in the function s(t). This is illustrated in FIG. 2(b) where the same bit sequence $A_k$ has been recorded as in FIG. 2(a) but with E=0.85, meaning in the notation chosen that every pit is extended by 0.85 T in both directions. Therefore the length of the shortest land 20 has become only 1.3 T in FIG. 2(b).

The error E may arise for example from over- or under-etching at a stage in the mastering process of a Compact Disc. By way of establishing a convention for the purposes of the present description a recording in which the error E is positive (zeros and resulting pits too long) will be referred to as "over-etched" and a recording where E is negative (zeros and resulting pits too short) will be referred to as "under-etched", whatever the actual cause of the error. It will be apparent that the error E is likely to remain constant, at least approximately, throughout any given recording.

In reading the pattern s(t) from the carrier 10, the perfectly square waveform s(t) becomes rounded and distorted by the reading process to produce a signal r(t). The reading process is modelled in FIG. 1 by a Channel Impulse Response (CIR) 24 and by the addition of random noise n(t) at 26. The CIR represents principally the reading of the marks s(t) on the carrier 10 with (for example) a focussed radiation spot having a finite diameter. The noise n(t) represents random effects due for example to dirt and scratches, and also to focussing, tracking and timing errors.

The signal r(t) is customarily filtered by a filter 28 to remove out-of-band noise and is then sampled every symbol interval T by a sampler 30 and passed through an equaliser 32 to produce a series of sample values $a_k$. The equaliser is a sampled-data filter designed to compensate for the CIR 24 and so reduce inter-symbol interference. The design of such equalizers is described for example in the book "Digital Communications" by J. Proakis (McGraw-Hill, New York, 1983).

The samples $a_k$ are then used by a bit detector 34 to generate the output data bit values $A_k'$. In known apparatus such as that described in the above cited U.S. Pat. No. 4,499,570, the bit detector 34 is simply a threshold comparator for comparing $a_k$ with a threshold level u. Since the data stream is nominally d.c.-free, the threshold u can conveniently be derived by integrating $A_k'$ over a large number of symbol intervals, as in the known detector.

Figures 3A, 3B:
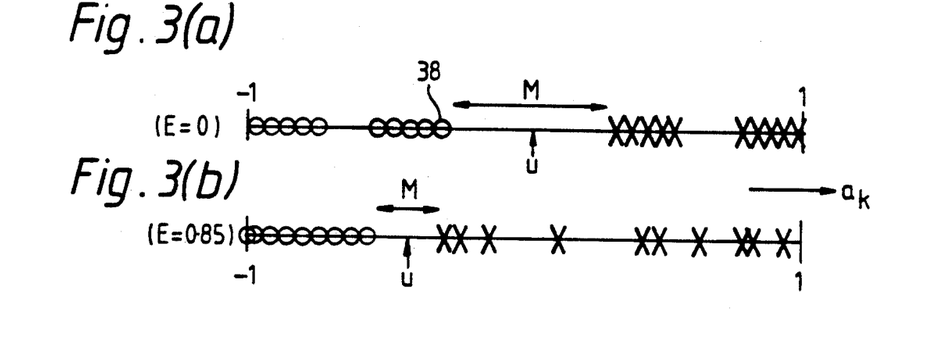
FIG. 3(a) and 3(b) show the effect of "over-etching" on the decision margin of the known bit detector.

FIG. 3(a) is a "scatter plot" showing the values of $a_k$ that will be recovered from a perfectly recorded (E=0) carrier with no noise (n(t)=0). On a scale of $-1$ to $+1$ (since the code is d.c.-free), the circles ('o') and crosses ('x') represent samples $a_k$ for which the intended bit values $A_k$ are zero and one respectively. It will be seen that the distribution of $a_k$ is not purely binary. This is because the radiation spot used for reading has a diameter which is in fact larger than the symbol interval T. In the Compact Disc system, for example, T represents 0.3 micron along the track and the laser spot diameter is nominally 1 micron. Therefore sampled values taken close to transitions in s(t), particularly within a minimum run-length pit or land, lie not at $-1$ or 1 but much closer to the threshold value u.

The system is designed, however, to leave a clear decision margin M around the threshold u. The margin M is wide enough so that a great deal of the random noise n(t) can be absorbed without causing detection errors. In other words there is room for the right-most circle 38 to move even closer to the threshold u, due to noise, without it being wrongly assigned a binary value $A_k' = 1$.

FIG. 3(b) is a similar scatter-plot arising from a badly "over-etched" pattern s(t) such as that shown in FIG. 2(b) (E=0.85). Whereas the distribution $a_k$ of circles and crosses for E=0 (FIG. 3(a)) was symmetrical, the distribution for E=0.85 is highly asymmetrical because the shortest lands (ones) in s(t) have become so short as to be barely detectable using the relatively large radiation spot. The threshold u can be adjusted as shown to distinguish still between the circles and the crosses, but the decision margin M is severely reduced. With such a small margin M, the detector is more prone to make decision errors in response to the random noise n(t), and so the error-correcting capability afforded by the subsequent decoding stages will be heavily used for correcting relatively minor errors (for example clocking and tracking errors), and will thus be less able to cope with further errors caused by fingermarks, scratches etc. on the record carrier. It should be noted that in direct recording technologies (write-once or erasable), decision margins are often much smaller than in the factory-produced CD's, so that systematic error is an even greater problem in such systems.

The embodiments to be described implement methods which use each sample $a_k$ and the two adjacent samples $a_{k-1}$ and $a_{k+1}$ to determine the binary value $A_k'$ which is to be assigned to the sample $a_k$. The methods rely on the fact that with a minimum run length greater than T there is correlation between successive samples. For example, it is known that certain combinations $(A_{k-1}, A_k, A_{k+1})$ will simply not occur, namely (0,1,0) and (1,0,1). Such information can be used to improve the decision margin.

The three sample values ($a_{k-1}$, $a_k$, $a_{k+1}$) can be visualised as coordinates of a point in a three-dimensional (3-D) space. An imaginary threshold surface would divide that space into two volumes and the bit value $A_k'$ could be assigned depending on which side of the surface a given sample point ($a_{k-1}$, $a_k$, $a_{k+1}$) fell. Such a technique would achieve the best possible decision margin using the three values available, but the complex calculations required make the 3-D technique expensive to adopt in a low cost apparatus. Accordingly, an economical embodiment of a method in accordance with the invention uses only two steps with just two samples used in each step. This embodiment is illustrated in FIG. 4 or FIG. 5, depending on the type of systematic error present.

Figure 4:
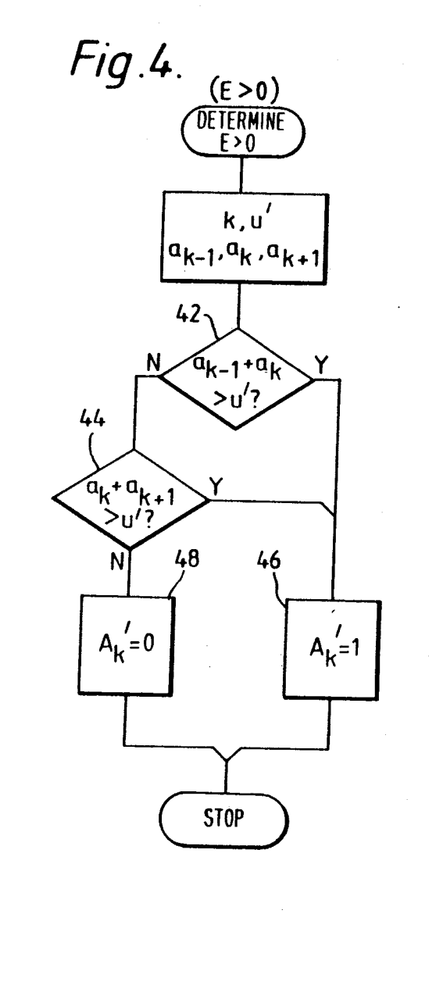
FIG. 4 and 5 are flow charts showing two alternative parts of a method embodying the invention which are suitable for reading "over"- and "under-etched" discs respectively.
Figure 5:
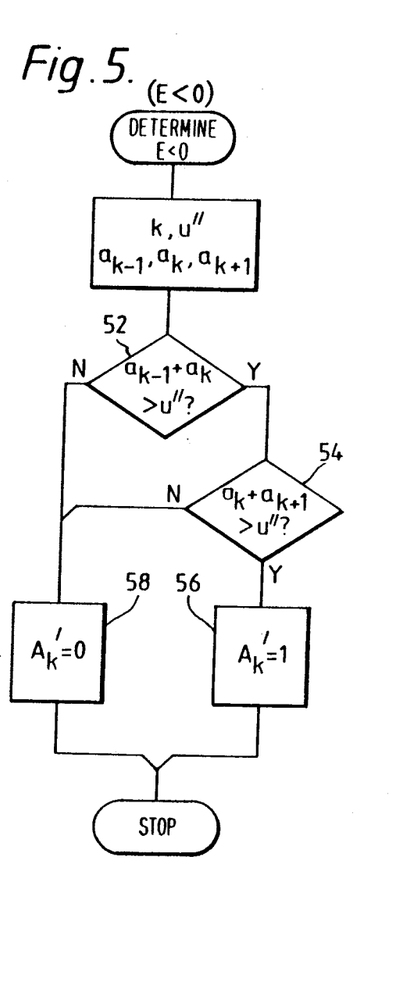

In the method of FIG. 4, which is appropriate for use where E is positive ("over-etched" case), a first comparison 42 compares the arithmetic sum of the first two sample values $a_{k-1}$ and $a_k$ with a threshold u' (which may vary between +2 and −2 rather than +1 and −1). If the sum is greater than u', then the binary value $A_k'=1$ is assigned to the sample $a_k$ in block 46. If the first sum is not greater than u', then a second comparison 44 compares the sum of the second two sample values $a_k$ and $a_{k+1}$ with u'. If the second sum is greater than u', then the bit value $A_k'=1$ is assigned in block 46 to the sample $a_k$. If neither of the two sums is greater than u' then the value $A_k'=0$ is assigned to the sample $a_k$ in block 48. After assigning the value $A_k'$, the method for the sample $a_k$ terminates, after which k may be incremented and the method repeated for the next sample $a_{k+1}$.

It will be seen that the order of performing the comparisons 42 and 44 is not important. Although in theory it can be predicted which comparison will lead directly to the required bit value $A_k'$ (depending in fact on whether a 0-1 or a 1-0 transition is expected) in practice it is simpler to perform both comparisons for every sample and combine the results as required so that:

$$A_k' = (a_{k-1} + a_k) > u'$$

OR $$(a_k + a_{k+1}) > u'.$$

This is the net effect of the blocks 42–48 in FIG. 4.

The method of FIG. 5, for use when the systematic error E is negative ("underetched" case) is very similar to that of FIG. 4 except that a different threshold value u'' is used and the blocks 52 to 58 which correspond to the blocks 42 to 48 of FIG. 4 are rearranged so that the net result is:

$$A_k' = (a_{k-1} + a_k) > u''$$

AND $$(a_k + a_{k+1}) > u''.$$

Figure 6A:
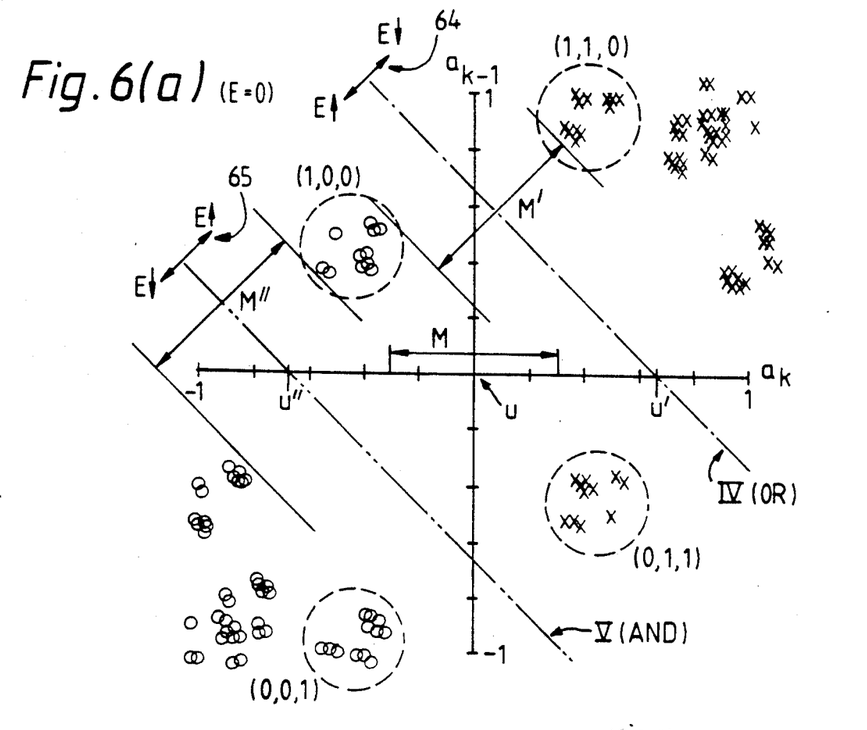
FIGS. 6(a) and 6(b) illustrate the operation of the methods of FIGS. 4 and 5 in the case of a disc with no systematic error.

FIGS. 6(a) and (b) are two-dimensional (2-D) scatterplots illustrating the action of the two comparisons 42/52 and 44/54 respectively of the methods of FIGS. 4 and 5. In FIG. 6(a) the horizontal coordinate is $a_k$ and the vertical coordinate is $a_{k-1}$. The scatter of noughts ($A_k=0$) and crosses ($A_k=1$) is now two-dimensional, but it can be seen that the projection of the 2-D scatter plot onto the horizontal axis would recreate the one-dimensional scatter plot shown in FIG. 3(a). The scatter plots of FIG. 6(a) and (b) thus correspond to a perfectly-etched recording (E=0). In each plot, four marginal groups of crosses and circles have been identified and each is labelled with the three sample values ($a_{k-1}$, $a_k$, $a_{k+1}$) which give rise to that particular group. As would be expected, these marginal groups are those where $a_k$ is next to a transition in the recorded signal s(t).

The threshold u and the decision margin M of the known simple threshold detector can therefore be marked as in FIG. 6(a). The decision threshold for the two dimensional comparison 42 in the 'OR' detection method (FIG. 4) is the diagonal line IV which has the equation $a_{k-1} + a_k = u'$. The decision threshold for the comparison 52 in the 'AND' detection method (FIG. 5) is the line V which has the equation $a_{k-1} + a_k = u''$. Since the CD channel is a linear-phase channel, the scatter plots such as those shown in FIGS. 6(a) and (b) have a high degree of mirror symmetry about the lines $a_k = a_{k-l}$ and $a_k = a_{k+1}$ respectively. The decision lines IV and V are perpendicular to those lines so that they offer the best decision margin.

Concentrating first on the 'OR' method (FIG. 4), it can be seen that only crosses ($A_k=1$) exist above the new decision line IV. Therefore, if comparison 42 indicates that ($a_{k-1} + a_k$) is greater than u', then $A_k'=1$ can be assigned with a degree of certainty given by a new decision margin M', marked on FIG. 6(a), which for a recording with E=0 is not much larger than the old margin M.

Figure 6B:
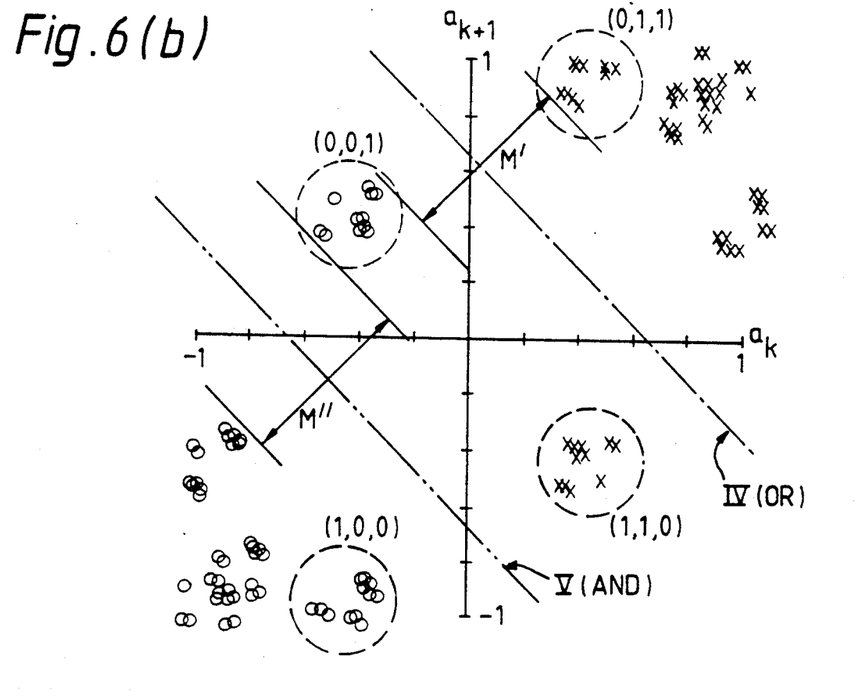

If ($a_{k-1} + a_k$) is not greater than u' (below line IV), it is not clear what value $A_k'$ should be assigned to the sample k. This is because the group of crosses corresponding to the sequence (0,1,1) lies below the line IV. In FIG. 6(b), however, which illustrates the action of the second comparison 44 in the method of FIG. 4, it can be seen that the same (0,1,1) group of crosses is clearly above the decision line IV for that comparison. Therefore in the second comparison 44 the (0,1,1) group of crosses can be distinguished from the circles with the new decision margin M'. Therefore in all cases either one or the other of the two comparisons 42 or 44 will yield a value $A_k'$ for the sample k, with a decision margin M'.

The operation of the 'AND' method (FIG. 5) is similar to that of the 'OR' method just described, and proceeds as follows. If the first comparison 52 in the method of FIG. 5 reveals that $a_{k-1} + a_k$ is less than the threshold u'', in other words that the pair of values correspond to a point below the line V in FIG. 6(a), then a value $A_k'=0$ can be assigned. If the point lies above the line V then the value $A_k'$ is not yet determined, since the (1,0,0) group of circles lies above that line. The second comparison 54 is then performed as illustrated in FIG. 6(b). For the second comparison, the (1,0,0) group is clearly below the line V so that after both comparisons 52 and 54, the value of $A_k'$ can be determined with a margin of M'', as marked on FIG. 6(a) and (b).

It can be seen from FIGS. 6(a) and (b) in which the systematic error E=0, that the new decision margins M' and M'', obtained using the 'OR' and 'AND' methods respectively, are equal and are only a little larger than the old margin M obtained with the known detector. Therefore these methods may have little advantage over the known methods for the ideal recording where E=0.

For recordings with a significant systematic error, however, the situation changes. The optimum threshold levels u' and u" change as E changes, as indicated at 64 and 65 on FIG. 6(a). The thresholds u' and u" both become more positive as the systematic error E becomes positive, and both become more negative as E becomes negative. More importantly, the decision margins M, M' and M" also change. This is illustrated in FIG. 7(a) and (b), which show the same two two-dimensional scatter plots as FIG. 6, but for the badly "over-etched" case where E=0.85.

Figure 7A:
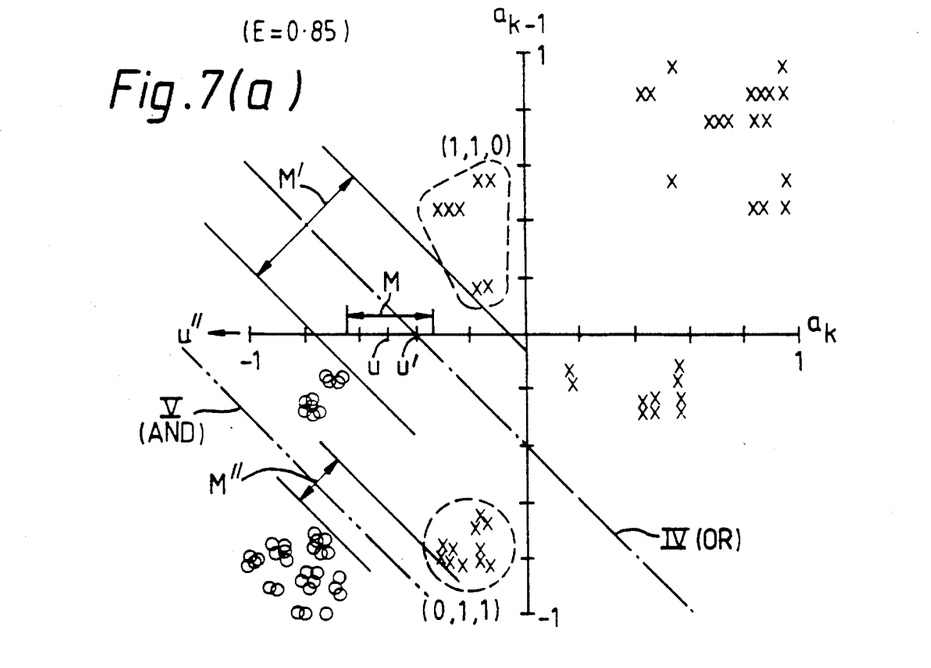
FIGS. 7(a) and 7(b) show how an improved decision margin is obtained by use of the method of FIG. 4 in the case of an "over-etched" disc.
Figure 7B:
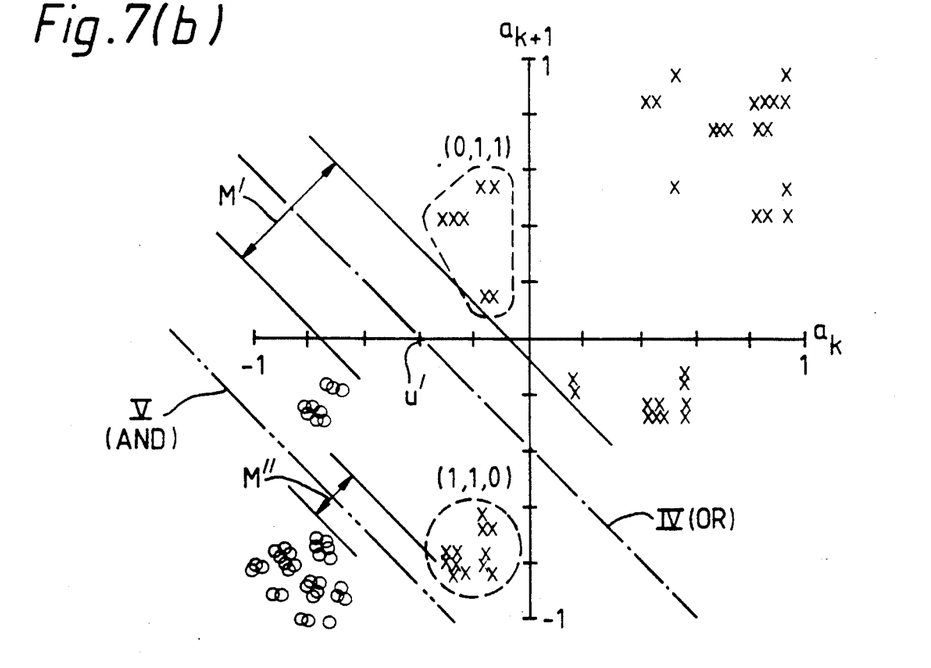

In FIG. 7, the circles representing $A_k=0$ are more confined to the lower left-hand corner of the plot, while the crosses spread downwards and leftwards towards them. Projecting all the circles and crosses onto the horizontal ($a_k$) axis would thus reproduce the one-dimensional scatter plot of FIG. 3(b), and the decision margin M for the known detector is shown next to the $a_k$ axis in FIG. 7(a).

The decision lines IV and V for the new 'OR' and 'AND' methods are also shown, however, and it can be seen clearly that the decision margin M' obtained by the 'OR' method (FIG. 4) is now much larger than the old margin M. In fact, for E positive, the margin M' will always be greater, so that the method of FIG. 4 affords a substantial advantage for example when reproducing an "over-etched" compact disc.

For "under-etched" discs (E negative), the method of FIG. 5 provides the greater decision margin M", since in that case the scatter plot of circles and crosses will be biased upwards and to the right, in the opposite manner to that shown in FIG. 7. Therefore, if one can determine the sign of the systematic error in a recording when it is first read, an improved decision margin can be obtained by selecting and using the appropriate detection method. Techniques for automatically selecting the correct method will be described below with reference to FIGS. 9 and 10.

Figure 8:
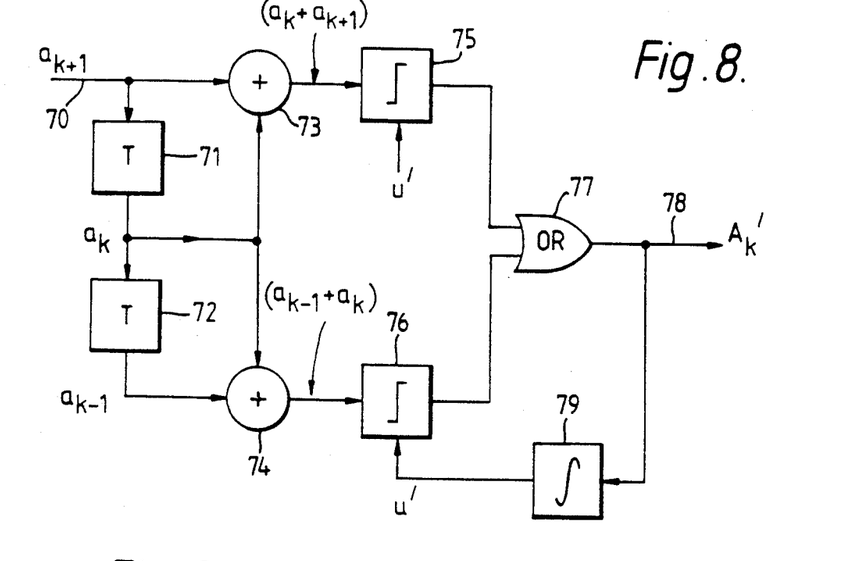
FIG. 8 shows an embodiment of part of a bit detector in accordance with the invention.

FIG. 8 shows a hardware bit detector suitable for implementing the 'OR' method of FIG. 4 (E-positive case). The sample values $a_{k-1}$, $a_k$, $a_{k+1}$ arrive serially at the detector from the disc reading apparatus (as described above with reference to FIG. 1) through an input 70. Two analogue delay circuits 71 and 72 are connected in series to the input 70. Each circuit 71 and 72 delays its input signal by one sample period T. Therefore when the value $a_{k+1}$ is available for each sample k at the input 70, the values $a_k$ and $a_{k-1}$ are available at the outputs of the first and second delay circuits 71 and 72 respectively as indicated in the Figure.

A first summing circuit 73 receives the values $a_{k+1}$ and $a_k$ from the input 70 and the output of the first delay circuit 71 and produces an output having a value $a_k+a_{k+1}$. This value is fed to a first thresholding circuit (comparator) 75, which also receives a current threshold value u'. The output of the first thresholding circuit 75 thus carries the result of the second comparison 44 in the flowchart of FIG. 4.

A second summing circuit 74 receives the values $a_k$ and $a_{k-1}$ from the outputs of the first and second delay circuits 71 and 72 respectively, and produces an output having a value $a_{k-1}+a_k$. This value is fed to a second thresholding circuit (comparator) 76, which also receives the current threshold value u'. The output of the second thresholding circuit 76 thus carries the result of the first comparison 42 in the flowchart of FIG. 4.

The outputs of the two thresholding circuits 75 and 76 are fed to first and second inputs respectively of an OR gate 77 whose output 78 thus carries the binary value $A_k'$ which is assigned to each sample k. For the case where E is negative ("under-etched") the 'AND' method of FIG. 5 can be implemented simply by changing the OR gate 77 to an AND gate.

An integrator 79 is used to define the threshold value u' for the thresholding circuits 75 and 76 in an adaptive fashion. The bit sequence $A_k'$ nominally contains as many ones as zeros, since the EFM-coded sequence $A_k$ (FIG. 1) is nominally d.c.-free. The integrator 79 serves to average $A_k'$ over many samples and varies the threshold u' at its output as required to keep the balance between ones and zeros in the output sequence $A_k'$.

Figure 9:
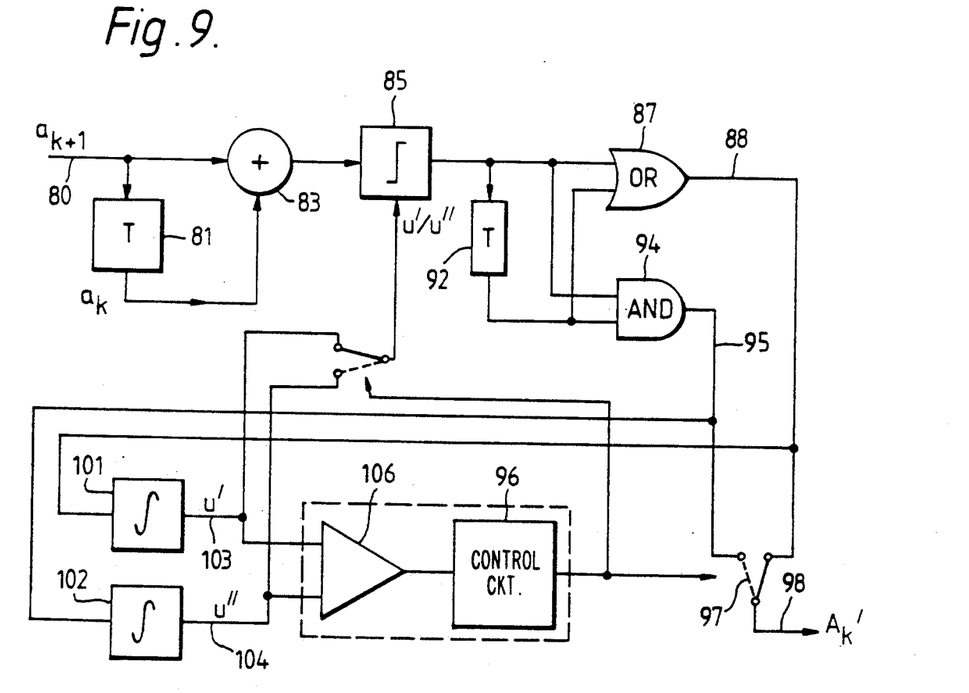
FIG. 9 shows an embodiment of a bit detector in accordance with the invention.

FIG. 9 shows an embodiment of a complete bit detector, which can select and implement the methods of FIG. 4 and FIG. 5. The embodiment of FIG. 9 incorporates hardware-saving features and also means for determining the polarity of the systematic error E. The parts referenced 80, 81, 83, 85, 87 and 88 correspond to the parts referenced 70, 71, 73 etc. in the detector of FIG. 8. However, there is no second delay circuit, second summing circuit or second thresholding circuit to correspond with the parts 72, 74 and 76 of FIG. 8. These circuits can be omitted because the values $a_{k-1}$ and $a_k$ for a given sample k are the same as the values $a_k$ and $a_{k+1}$ for the previous sample. Therefore in FIG. 8 the output of the second thresholding circuit 76 is simply a delayed version of the output of the first thresholding circuit 75.

Accordingly, in FIG. 9 a single logic delay latch 92 is connected to the output of the sole thresholding circuit 85 to store the result of each comparison for one sampling period T to form the other comparison result for the next sample. The output of the latch 92 is connected to the second input of the OR gate 87.

An AND gate 94 has first and second inputs connected in parallel with those of the OR gate 87 and has an output 95. A control circuit 96 controls an electronic switch 97 in order to connect either the output 88 of the OR gate 87 or the output 95 of the AND gate 94 to an output 98 which carries the output bit sequence $A_k'$. By implementing both the 'OR' and the 'AND' methods in the detector of FIG. 9, the control circuit 96 is able to configure the detector to implement whichever of the two alternative methods is required to cope with the systematic error E in a given recording.

The control circuit 96 clearly requires knowledge of the polarity of the systematic error E in order to select the best position for the switch 97. Various techniques are possible for this. One possibility is to calculate the average of the sign of the sample values $a_k$ over a large number of samples.

The technique embodied in the detector of FIG. 9 on the other hand is to use the version of the detector (i.e. the 'OR' or the 'AND' method) which has the lower magnitude of threshold value u' or u" respectively. This is achieved by providing two integrators 101 and 102 connected to the outputs 88 and 95 of the OR and AND versions of the detector respectively. In operation, the values of u' and u" are thus generated continuously and in parallel at the outputs 103 and 104 of the integrators and applied to inputs of a magnitude comparator 106 forming part of the control circuit 96. The method giving the lower magnitude threshold value is then selected by the control circuit 96 by operating the switch 97, and a further switch 108 is also provided to supply the appropriate threshold value u' or u" to the threshold detector 85, as shown. As mentioned above in relation to FIG. 6, the decision margins M' and M" for the 'OR' and 'AND' methods are substantially equal when replaying a perfect recording, where E=0. Therefore the selection to be made when the systematic error is too small to be detected as one type or the other can be decided arbitrarily. The sequence of operation of the control circuit 96 is illustrated in the flow chart of FIG. 10.

In an alternative embodiment using only one integrator, connected to the output 98, the control circuit 96 could arrange for a small part of a new recording to be read with the switch 97 in both positions and could then select the position which gave the lowest magnitude for the threshold value to be used for the playback of the rest of that recording. A disadvantage of using only one integrator is that it may be necessary to interrupt or delay playback to use each version of the detector in turn so as to enable a comparison of both versions to be made.

Figure 10:
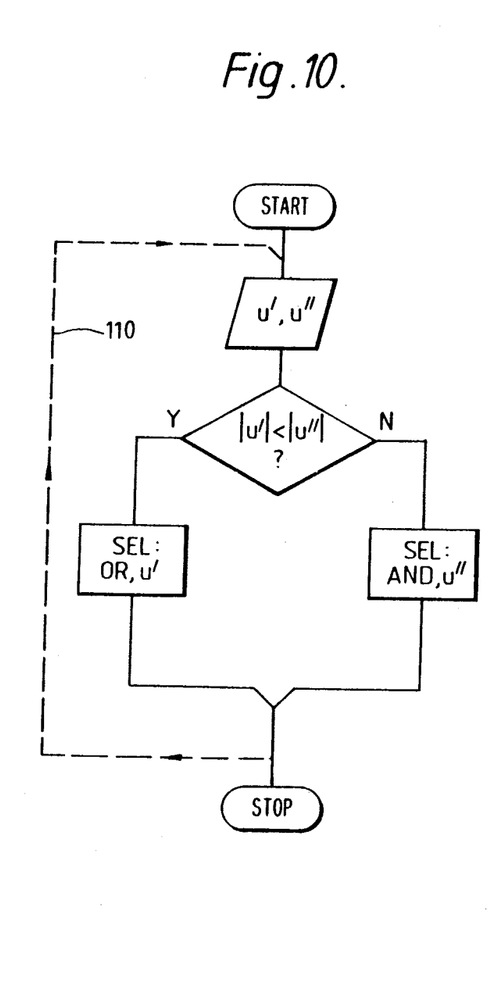
FIG. 10 is a flow chart illustrating the operation of the control circuit in the detector of FIG. 9.

The embodiment of FIGS. 9 and 10 with two integrators can adapt easily to changes in the polarity of the systematic error E by implementing the sequence of operations shown in FIG. 10 continuously, or at least periodically, as indicated by the dashed flow path 110 in FIG. 10. This may be advantageous for example when reproducing recordings made at different times or on different recording apparatuses, for example in writable/erasable recording technologies, in which E may vary significantly between different parts of the same record carrier. If this control sequence is to be implemented continuously, or at any great frequency, it may be advantageous to incorporate a degree of hysteresis into the comparison of the two threshold values. Otherwise, excessive switching between the two methods might occur when E is very close to zero and fluctuates in sign due to random variations.

Yet another alternative would be to use each method of the detector in turn and compare the rates of errors detected in each case by a subsequent decoding circuit such as that used in the Compact Disc System, but this will commonly be less sensitive than those methods described above.

Those skilled in the art will recognise that the embodiments described herein are not the only ones possible within the scope of the invention. It should be noted in particular that the notation and sign conventions adopted herein are purely exemplary and that the polarities and meanings of signals may well be reversed or interchanged in a particular application. For example the terms "over-etched" and "under-etched" as used herein are entirely interchangeable since in a typical mastering process a recording will exist in both positive and negative impressions before its final form is fixed. Similarly, the reference to etching in those terms is merely exemplary and it will be appreciated that they are used to refer to all sources of systematic error in the run-lengths of a recorded bit pattern, by whatever process the recording is made. Furthermore the term "pattern of marks" should be construed as including any detectable binary pattern, whether it is detectable optically or otherwise, and whether the marks are mechanical features as in the CD system or are variations in some other property of a recording medium as, for example, in phase-change and magneto-optical recording technologies.

Furthermore, the method of the invention can be extended to make use of more than three adjacent samples. The extra decision margin gained (if any) will depend on the minimum run length in the particular pattern and also on the channel impulse response. In the case of Compact Disc with EFM coding the benefit obtainable by extending the method to use more than three samples is considered to be minimal with present channel characteristics.

From reading the present disclosure, yet other modifications will be apparent to persons skilled in the art. Such modifications may involve other features which are already known in the design, manufacture and use of bit detectors, recording systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features in any further application derived herefrom.

I claim:

1. A method of assigning binary values to each of a series of successive sample values taken periodically from a waveform representing a binary pattern of marks on a record carrier, the pattern of marks having a nominal minimum run length of more than one sampling period, the method comprising the steps of:

(a) determining whether the pattern of marks is subject to a first or a second type of systematic error, the first type causing the marks on the record carrier to be systematically too short and the second type causing the marks on the record carrier to be too long relative to the nominal minimum run length; and for each sample value $a_k$ in said series:

(b) combining a series of successive sample values which include the sample value $a_k$ to generate one or more combined sample values;

(c) establishing a threshold value;

(d) comparing each combined sample value determined in step (b) with said threshold value; and (e) assigning a binary value to the sample value $a_k$ in accordance with the results of the comparisons in step (d) and a logic relationship dependent on which type of systematic error, if any, is determined to be present in step (a).

2. A method of assigning binary values to each of a series of successive sample values taken periodically from a waveform representing a binary pattern of marks on a record carrier, the pattern of marks having a nominal minimum run length of more than one sampling period, the method comprising the steps of:

(a) determining whether the pattern of marks is subject to a first or a second type of systematic error, the first type causing the marks on the record carrier to be systematically too short and the second type causing the marks on the record carrier to be too long relative to the nominal minimum run length; and for each sample value $a_k$ in said series:

(b) combining the sample value $a_k$ with a first of the sample values adjacent thereto in said series;

(c) establishing a predetermined threshold level;
(d) comparing the combined value determined in step (b) with the predetermined threshold level; and
(e) assigning to the sample value $a_k$ either:
  (i) a binary value corresponding to the result of the comparison in step (d), or
  (ii) a binary value determined by combining the sample value $a_k$ with a second of the sample values adjacent thereto in said series so as to generate a further combined value, comparing the further combined value with the threshold level, and assigning to the sample value $a_k$ a binary value corresponding to the result of the comparison of the further combined value with the threshold level.

3. A method of assigning binary values to each of a series of successive sample values taken periodically from a waveform representing a binary pattern of marks on a record carrier, the pattern of marks having a nominal minimum run length of more than one sampling period, the method comprising the steps of:
  (a) determining whether the pattern of marks is subject to a first or a second type of systematic error, the first type causing the marks on the record carrier to be systematically too short and the second type causing the marks on the record carrier to be too long relative to the nominal minimum run length; and
  for each sample value $a_k$ in said series:
  (b) combining the sample value $a_k$ with a first of the two sample values adjacent thereto in said series so as to derive a first combined value, and further combining the sample value $a_k$ with the second of the adjacent sample values so as to derive a second combined value;
  (c) establishing a threshold level;
  (d) comparing the first combined value derived in step (b) with said threshold level to derive a first comparison result, and comparing the second combined value derived in step (b) with said threshold level to derive a second comparison result; and
  (e) deriving a logical combination of the first and second comparison results derived in step (d), and assigning to the sample $a_k$ a binary value corresponding to the result of such logical combination.

4. A method as claimed in claim 3 wherein said logical operation for assigning a binary value to the sample $a_k$ is in accordance with the type of systematic error which is determined to be present in step (a).

5. A method of assigning binary values to each of a series of sample values of successive samples taken periodically from a waveform representing a binary pattern of marks on a record carrier, the pattern of marks having a nominal minimum run length of more than one sampling period, the method comprising the steps of:
  (a) determining whether the pattern of marks is subject to a first or a second type of systematic error, the first type causing the marks on the record carrier to be systematically too short and the second type causing the marks on the record carrier to be too long relative to the nominal minimum run length; and
  for each sample value $a_k$ in said series:
  (b) combining the sample value $a_k$ with the next succeeding sample value in the series;
  (c) establishing a predetermined threshold level;
  (d) comparing the combined value determined in step (b) with the predetermined threshold level;
  (e) storing the result of the comparison in step (d) for at least one sampling period for use in determining the binary value of said next sample value; and
  (f) assigning a binary value to said next sample value in accordance with the results of comparison of said next sample value with the comparison result stored in step (d) and a logic relationship dependent on which type of systematic error is determined in step (a) to be present.

6. A method as claimed in any of claims 1-5 wherein each combined sample value is the sum of the sample values from which it is derived.

7. A detector for assigning binary values to each of a series of successive sample values taken periodically from a waveform representing a binary pattern of marks on a record carrier, the pattern of marks having a nominal minimum run length of more than one sample period, said detector comprising:
  error detecting means for determining whether the pattern of marks is subject to a first or a second type of systematic error, the first type causing the marks on the record carrier to be systematically too short relative to the nominal minimum length and the second type causing the marks on the record carrier to be too long relative to the nominal minimum run length;
  combining means which, for each sample value $a_k$ in said series, is adapted to combine a plurality of successive sample values which include the sample value $a_k$ so as to generate one or more combined sample values;
  comparison means coupled to said combining means for establishing a threshold level and comparing each of the combined sample values with said threshold level so as to derive respective comparison results; and
  means coupled to said comparison means and responsive to said comparison results to assign a binary value to the sample value $a_k$ in accordance with a logic relationship dependent on which type of systematic error, if any, is determined to be present by said error detecting means.

8. A detector as claimed in claim 7, wherein said combining means is adapted to combine the sample value $a_k$ with a first of the two sample values adjacent thereto in said series so as to derive a first combined value, and to further combine the sample value $a_k$ with the second of the adjacent sample values so as to derive a second combined value; and
  said means for assigning a binary value to the sample value $a_k$ is adapted to do so by:
    (i) assigning a binary value to the sample $a_k$ in accordance with to the comparison result derived by said comparison means from said first combined value; or
    (ii) assigning a binary value to the sample value $a_k$ in accordance with the comparison result derived by said comparison means from said second combined value and the type of systematic error determined to be present by said error detecting means.

9. A detector as claimed in claim 7, wherein said combining means is adapted to combine the sample value $a_k$ with a first of the two sample values adjacent thereto so as to derive a first combined value and to further combine the sample value $a_k$ with the second of the adjacent sample values so as to derive a second combined value; said comparison means is adapted to compare each of said first and second combined values with said threshold level; and said means for assigning a binary value to the sample value $a_k$ is adapted to do so by deriving a logical combination of the results of said two comparisons.

10. A detector as claimed in claim 9, wherein said means for assigning a binary value is controlled by said error detecting means in accordance with which type of systematic error is determined to be present.

11. A detector as claimed in claim 10, further comprising means for adaptively determining said threshold level by feedback of the binary values assigned to sample values preceding the sample value $a_k$, and the error detecting means is responsive to the threshold level to determine the kind of logical combination to be derived by said means for assigning a binary value.

12. A detector as claimed in any one of claims 7 to 10, further comprising means for storing the comparison results derived for the sample value $a_k$ for at least one sampling period so as to be available for use in assigning a binary value to the next succeeding sample value.

13. A detector as claimed in claim 11, wherein the means for combining the sample value $a_k$ with an adjacent sample value comprises a summing circuit.

* * * * *